(12) United States Patent  (10) Patent No.: US 8,812,014 B2
Do  (45) Date of Patent: Aug. 19, 2014

(54) AUDIO-BASED ENVIRONMENT AWARENESS

(75) Inventor: Ju-Yong Do, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 12/871,489

(22) Filed: Aug. 30, 2010

(65) Prior Publication Data

US 2012/0052872 A1   Mar. 1, 2012

(51) Int. Cl.
*H04W 24/00* (2009.01)
*H04M 3/00* (2006.01)
*H04B 7/00* (2006.01)
*H04L 12/26* (2006.01)
*G10L 15/00* (2013.01)

(52) U.S. Cl.
USPC ..... 455/456.1; 455/418; 455/420; 455/456.5; 455/456.2; 370/310; 370/252; 704/246; 704/233

(58) Field of Classification Search
USPC ....................................................... 455/456.1
See application file for complete search history.

(56) References Cited

U.S. PATENT DOCUMENTS

| | | | |
|---|---|---|---|
| 7,675,414 B2 | 3/2010 | Ray | |
| 2004/0259536 A1 | 12/2004 | Keskar et al. | |
| 2006/0019679 A1* | 1/2006 | Rappaport et al. | 455/456.5 |
| 2006/0046707 A1* | 3/2006 | Malamud et al. | 455/420 |
| 2006/0232472 A1* | 10/2006 | Roslak | 342/457 |
| 2008/0064413 A1 | 3/2008 | Breed | |
| 2008/0101454 A1* | 5/2008 | Luff et al. | 375/240 |
| 2009/0262673 A1 | 10/2009 | Hermersdorf | |
| 2010/0035632 A1 | 2/2010 | Catten | |
| 2010/0172510 A1* | 7/2010 | Juvonen | 381/71.6 |
| 2010/0322035 A1* | 12/2010 | Rhoads et al. | 367/118 |
| 2011/0070898 A1* | 3/2011 | Sanjeev et al. | 455/456.2 |
| 2011/0257974 A1* | 10/2011 | Kristjansson et al. | 704/246 |
| 2012/0004909 A1* | 1/2012 | Beltman et al. | 704/233 |
| 2012/0069767 A1* | 3/2012 | Minde | 370/252 |

FOREIGN PATENT DOCUMENTS

GB  2445436 A  7/2008
WO  WO03091899 A2  11/2003

OTHER PUBLICATIONS

SourroundSense Mobile Phone Localization via Ambience Fingerprinting, Azizyan, Martin; Constandache, Ionut; Choudhury, Romit Roy; MobiCom '09, Sep. 20-25, 2009, Beijing, China.
International Search Report and Written Opinion—PCT/US2011/049778-ISA/EPO—Dec. 13, 2011.
Jian Yuan, et al., "Classify of underwater target utilizing Audio fingerprint", Information Technology and Applications, 2005. ICITA 2005. Third International Conference on Sydney, Australia Jul. 4-7, 2005, Piscatsway, NJ, USA, IEEE, vol. 2,4 (Jul. 4-7, 2005), pp. 179-184, XP010821220, DOI:10. 1109/ICITA.2005.96 ISBN:978-0/7695-2316-3 cols. 1-7,10.

(Continued)

*Primary Examiner* — Timothy Pham
(74) *Attorney, Agent, or Firm* — Arnold J. Gum

(57) ABSTRACT

A method of determining a position of a mobile device in a wireless communication network includes: accessing mobile device audio information from the mobile device; analyzing the mobile device audio information to determine an environmental characteristic of a present environment of the mobile device; and using the environmental characteristic to affect a determination of the position of the mobile device.

45 Claims, 8 Drawing Sheets

(56) References Cited

OTHER PUBLICATIONS

Stephan Sigg, et al., "Audio fingerprinting in ubicomp environments a performance measurements and applications", Networked Sensing Systems, 2008. INSS 2008.5TH International Conference on, IEEE, Picatsway, NJ, USA, (Jun. 17, 2008), p. 239, XP031314942, ISBN:978-4-907764-31-9.

* cited by examiner

| Sensor Information 62 | | | Environmental Characteristics 64 | | | Time Information 66 | |
|---|---|---|---|---|---|---|---|
| Audio Information 68 | | Visual Info 70 | Location Type 78 | Location 80 | Determination Settings/ Techniques 82 | Time of Day 84 | Date 86 |
| Signal Magnitude 74 | Spectral Characteristics 76 | | | | | | |
| Signal 72 | | | | | | | |

AUDIO-BASED ENVIRONMENT AWARENESS

BACKGROUND

Often, it is desirable to know the location of a wireless user. In fact, it is sometimes necessary. For example, for an enhanced 911 (E-9-1-1) wireless service, the location of a mobile station (e.g., a cellular phone) may be provided to a Public Safety Answering Point (PSAP) each time a 911 call is made from the mobile station. Further, a network operator/service provider may support various applications that use location based services. Such services provide the location of mobile stations. The term "applications" refers to the particular uses that are made of location information. Often times, applications are implemented with computer software that is either executed by a processor within a mobile station or by a processor located within a component of a wireless infrastructure network that is in communication with the mobile station. Applications that use this information may include, for example, location-sensitive billing, asset tracking, asset monitoring and recovery, fleet and resource management, personal-location services, and so on. Some specific examples of applications for personal-location services include (1) providing a local map to a mobile station based on its location, (2) providing a recommendation for a facility (e.g., a hotel or a restaurant) based on the mobile station's location, and (3) providing directions to the recommended facility from the mobile station's current location.

There are many different types of technologies that may be employed in calculating the location of mobile stations in wireless networks with various levels of success and accuracy. Examples of location technologies include Satellite Positioning Systems (SPS's) (including the United States' Global Positioning System (GPS), the Russian GLObal NAvigation Satellite System (GLONASS), the European Galileo System, the Chinese Compass/Beidou System, etc.), Advanced Forward Link Trilateration (AFLT), timing advance (TA), and terrestrial-based enhanced observed time difference (E-OTD) position fixing. Various positioning technologies use devices such as satellites and/or wireless communication network devices (e.g., base stations, WiFi stations, etc.) to determine mobile device positions.

Different techniques/technologies have different abilities to locate mobile devices. The variation in location abilities depends on several factors such as number of location devices, range of the location devices, environment of the mobile device, etc.

SUMMARY

An example of a method of determining a position of a mobile device in a wireless communication network includes: accessing mobile device audio information from the mobile device; analyzing the mobile device audio information to determine an environmental characteristic of a present environment of the mobile device; and using the environmental characteristic to affect a determination of the position of the mobile device.

Implementations of such a method may include one or more of the following features. Analyzing the mobile device audio information includes comparing the mobile device audio information with a statistical model of audio patterns and corresponding environment types. The method of claim 1 wherein using the environmental characteristic comprises setting a position determination formula parameter based on the environmental characteristic, and wherein the position of the mobile device is determined using the position determination formula parameter. Using the environmental characteristic includes selecting one or more location information sensors for use in obtaining information for use in determining the position of the mobile device. Using the environmental characteristic includes changing the determination of the position based on a change of the present environment of the mobile device. Using the environmental characteristic includes using a position associated with the present environment as a seed position. Accessing the mobile device audio information includes accessing noise level information and analyzing the mobile device audio information includes comparing the accessed noise level information with noise levels associated with different environmental characteristics. Accessing the mobile device audio information includes accessing spectral characteristics and analyzing the mobile device audio information includes comparing the accessed spectral characteristics with spectral characteristics associated with different environments. Accessing the mobile device audio information includes obtaining mobile device audio information from multiple microphones of the mobile device. The method further includes accessing non-audio sensor information and analyzing the non-audio sensor information in conjunction with the mobile device audio information to determine the environmental characteristic.

Implementations of the example method may also, or alternatively, include one or more of the following features. Using the environmental characteristic includes analyzing a look-up table of combinations of examples of environmental characteristic and determination information for affecting the determination of the position, and using the determination information in the determination of the position of the mobile device. The look-up table includes a region-specific look-up table based on a region presently containing the mobile device, the method further including downloading the look-up table to the mobile device. The look-up table is downloaded to the mobile device in response to determining the region presently containing the mobile device.

Implementations of the example method may also, or alternatively, include one or more of the following features. Accessing the mobile device audio information from the mobile device includes obtaining noise information from a noise canceling mechanism. Using the environmental characteristic includes affecting a search of a positioning device based on the environmental characteristic. Affecting the search of the positioning device includes at least one of: (1) altering a search procedure for a satellite or a WLAN access point; (2) affecting which satellites or WLAN access points are searched for; or (3) setting a threshold used in searching for the satellite or WLAN access point. Analyzing the mobile device audio information includes analyzing the mobile device audio information for specific sounds or frequencies associated with known environments. The environmental characteristic is at least one of an environment type or a position. The method is one of (1) a mobile standalone method wherein the analyzing is performed by the mobile device, (2) a mobile-assisted method wherein the analyzing is performed by the mobile device and the method further comprises wirelessly downloading by the mobile device of at least portions of statistical models for use in the analyzing, and (3) a server-based method wherein the mobile device audio information is wirelessly uploaded from the mobile device and the analyzing is performed by a server displaced from the mobile device.

An example of a computer program product residing on a processor-readable medium includes processor-readable instructions configured to cause a processor to: access mobile device audio information from a mobile device in a wireless telecommunication network; analyze the mobile device audio information to determine an environmental characteristic of a present environment of the mobile device; and use the environmental characteristic to affect a determination of a position of the mobile device.

Implementations of the example computer program product may include one or more of the following features. The instructions configured to cause the processor to analyze the mobile device audio information are configured to cause the processor to compare the mobile device audio information with a statistical model of audio patterns and corresponding environment types. The instructions configured to cause the processor to use the environmental characteristic are configured to cause the processor to set a position determination formula parameter based on the environmental characteristic, the instructions further comprising instructions configured to cause the processor to determine the position of the mobile device using the position determination formula parameter. The instructions configured to cause the processor to use the environmental characteristic are configured to cause the processor to select one or more location information sensors for use in obtaining information for use in determining the position of the mobile device. The instructions configured to cause the processor to use the environmental characteristic are configured to cause the processor to use a position associated with the present environment as a seed position. The instructions further include instructions configured to cause the processor to access non-audio sensor information and to analyze the non-audio sensor information in conjunction with the mobile device audio information to determine the environmental characteristic. The instructions further include instructions configured to cause the processor to access region-specific associations of mobile device audio information and environmental characteristics corresponding to a region presently containing the mobile device. The instructions configured to cause the processor to access the mobile device audio information are configured to cause the processor to obtain noise information, from a noise canceling mechanism, as the mobile device audio information. The instructions configured to cause the processor to use the environmental characteristic are configured to cause the processor to affect a search of a positioning device based on the environmental characteristic by at least one of: (1) altering a search procedure for a satellite or a WLAN access point; (2) affecting which satellites or WLAN access points are searched for; or (3) setting a threshold used in searching for the satellite or WLAN access point. The processor-readable medium resides in at least one of the mobile device or a server displaced from the mobile device.

An example apparatus for determining a position of a mobile device in a wireless communication network includes: a memory storing records of audio sensor information and associated environmental characteristics for a plurality of sample environments; and a processor coupled to the memory and configured to: receive mobile device audio information collected by an audio sensor of the mobile device; compare the received mobile device audio information with the stored audio sensor information to select a stored record of audio sensor information corresponding to the received mobile device audio information and an associated environmental characteristic of a present environment of the mobile device; and use the associated environmental characteristic of the selected record to determine the position of the mobile device.

Implementations of the example apparatus may include one or more of the following features. The processor is configured to use the associated environmental characteristic of the selected record to set a position determination formula parameter based on the associated environmental characteristic, and to determine the position of the mobile device using the position determination formula parameter. The processor is configured to use the associated environmental characteristic of the selected record to select one or more location information sensors for use in obtaining information for use in determining the position of the mobile device. The processor is configured to compare at least one of a noise level or a spectral characteristic of the received mobile device audio information with noise levels or spectral characteristics, respectively, of the stored audio sensor information. The apparatus is the mobile device and the mobile device further includes multiple microphones disposed, coupled, and configured to obtain and provide the mobile device audio information to the processor. The memory further stores non-audio information and the processor is further configured to receive non-audio sensor information from the mobile device and analyze the non-audio sensor information in conjunction with the mobile device audio information to determine the associated environmental characteristic. The processor is configured to request records of mobile device audio information that are associated with a present position of the mobile device. The apparatus is the mobile device and the apparatus further includes a noise cancellation module coupled to the processor and configured to filter background noise from sensed audio resulting in filtered background noise and to provide the filtered background noise to the processor as the mobile device audio information collected by an audio sensor of the mobile device. The processor is configured to use the associated environmental characteristic to at least one of: (1) select a search procedure for a satellite or a WLAN access point; (2) select which satellites or WLAN access points are searched for; or (3) set a threshold used in searching for the satellite or WLAN access point. The apparatus comprises one of (1) the mobile device, wherein the mobile device is configured to operate in a mobile standalone mode, (2) the mobile device, wherein the mobile device is configured to operate in a mobile-assisted mode and further comprises a transceiver configured to receive wirelessly at least portions of the stored audio sensor information, or (3) a server further comprising the transceiver configured to receive the mobile device audio information collected by the audio sensor of the mobile device.

Another example of an apparatus for determining a position of a mobile device in a wireless communication network includes: means for accessing mobile device audio information from the mobile device; analyzing means analyzing the mobile device audio information to determine an environmental characteristic of a present environment of the mobile device; and processing means for using the environmental characteristic to affect a determination of the position of the mobile device.

Implementations of the another example apparatus may include one or more of the following features. The analyzing means are configured to compare the mobile device audio information with a statistical model of audio patterns and corresponding environment types. The processing means are configured to set a position determination formula parameter based on the environmental characteristic and to determine the position of the mobile device using the position determination formula parameter. The processing means are configured to select one or more location information sensors for use in obtaining information for use in determining the position of the mobile device. The means for accessing and the analyzing means are configured to access at least one of noise level information or spectral characteristics and to compare at least one of the accessed noise level information or accessed spectral characteristics with noise levels or spectral characteristics associated with different environmental characteristics. The means for accessing are configured to access non-audio sensor information and the analyzing means are configured to analyze the non-audio sensor information in conjunction with the mobile device audio information to determine the environmental characteristic. The means for accessing are configured to access region-specific combinations of mobile device audio information and corresponding environmental characteristics based on a region presently containing the mobile device. The means for accessing the mobile device audio information comprises a noise canceling mechanism. The processing means are configured to affect a search of a positioning device based on the environmental characteristic. The apparatus includes one of (1) the mobile device, wherein the mobile device is configured to operate in a mobile standalone mode, (2) the mobile device, wherein the mobile device is configured to operate in a mobile-assisted mode and further comprises a transceiver configured to receive wirelessly at least portions of the stored audio sensor information, or (3) a server further comprising the transceiver configured to receive the mobile device audio information collected by an audio sensor of the mobile device.

Items and/or techniques described herein may provide one or more of the following capabilities. Location of mobile devices may be determined more quickly and/or more accurately with less power consumption than with previous techniques. Low power consumption audio measurement and processing can be used to reduce higher power consumption activities such as position determination. Assistance can be provided to help determine the position of a mobile device based on environmental information sensed by the mobile device. The assistance generation is achieved from low power measurement and low computation processing and helps to reduce or even minimize overall power consumption in position determination. Audio measurement and processing can be used to select a set of positioning sensors and/or positioning sensor settings, e.g., based on environment type. While item/technique-effect pairs have been described, it may be possible for a noted effect to be achieved by means other than those noted, and a noted item/technique may not necessarily yield the noted effect.

BRIEF DESCRIPTION OF THE DRAWINGS

FIG. 4 block diagram of a table of associated sensor information, environmental characteristics, and time information.

DETAILED DESCRIPTION

Figure 1:
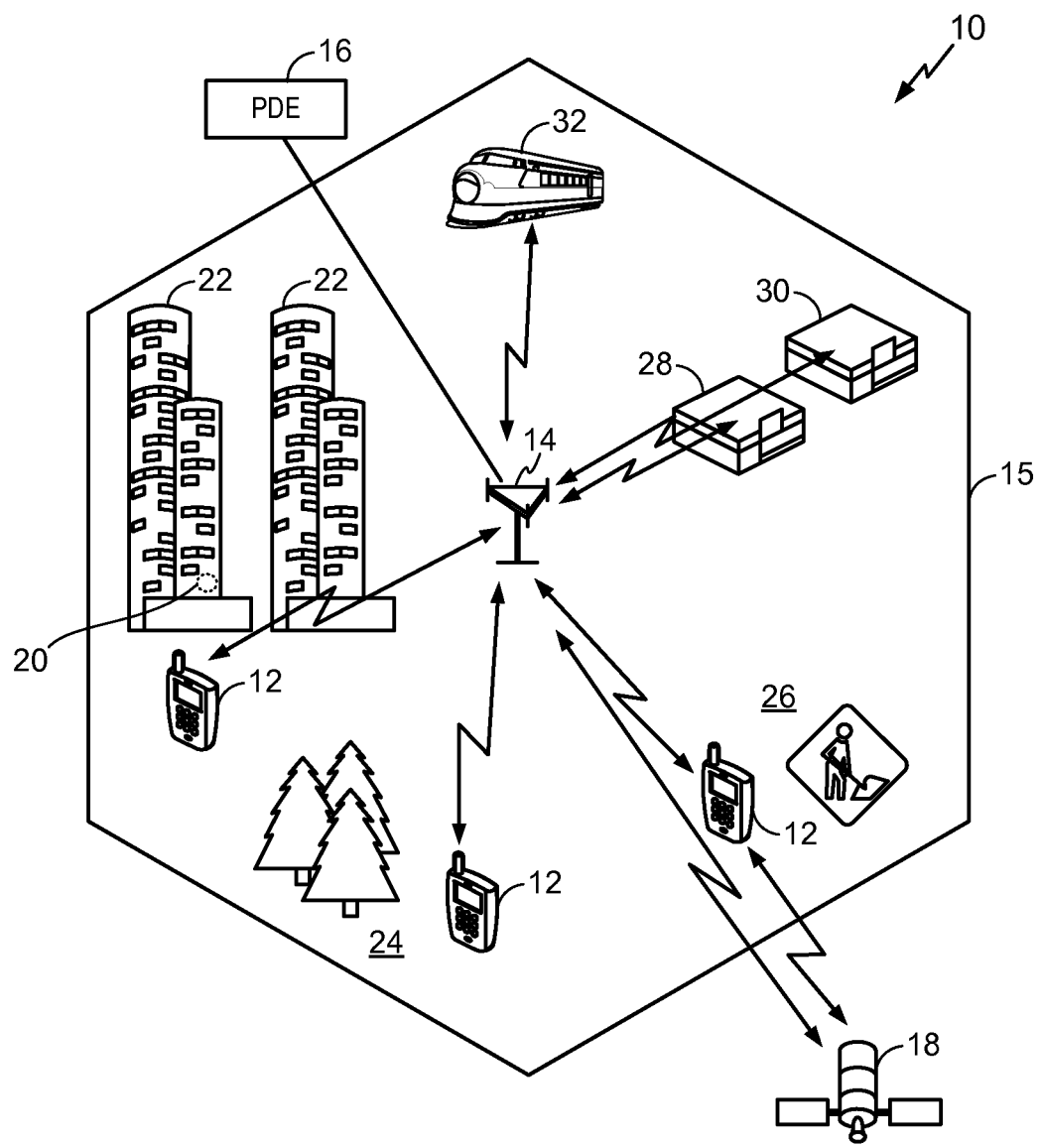
FIG. 1 is a schematic diagram of a wireless communication and positioning network.

The disclosure provides techniques to determine better (e.g., more accurately, faster) a position of a mobile device (e.g., a cell phone). Environmental characteristics of an environment of the device are determined based on measurable data, in particular audio, at the mobile device.

The environmental characteristics may be determined by analyzing the audio input to the mobile device. The received audio may be stored and compared with known statistical models associated with different environments (e.g., indoor, outdoor, office, roadside, residential area, business district) to determine the current environment. The models may be based on sound level (decibels) and/or spectral characteristics of the audio. Further, historical audio data associated with locations can be used to help improve the statistical models and thus the environment determination. These data may be collected by the mobile device and/or other mobile devices. The type of environment determination may be further assisted by other factors, such as the time of day, day of the week, time of year, etc., and/or historical location of the mobile device based on these times/days.

The device may collect audio data when its microphone is active and may be automatically triggered periodically to obtain audio data. The environment can be determined, e.g., periodically, in advance of a request for location information in order to expedite processing when a location request is received.

Knowledge of the environmental characteristics is used to help determine position. First, the environment can be used to set/adjust a dynamic model used for position determination, e.g., one or more parameters of position-determining processing and/or to provide a seed location (position) if the environment can be linked to a particular location (e.g., a cell of a cellular network). For example, a filtering coefficient of a Kalman filter or a maximum acceleration can be set. Second, which location information sensors to use for position determination, e.g., GPS sensors, WiFi, etc., can be selected based on the environment. Third, the environment can be used to indicate motion detection, e.g., movement from indoors to outdoors, movement in a particular direction if two determined environments have associated locations.

Further, non-audio information (e.g., still or moving images) may be used in environment determination. For example, non-audio information may be obtained to assist and/or confirm the environment determination made using the audio information, or used to determine the environment independent of audio information.

Techniques described herein may be used for various wireless communication systems such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95 and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA.

A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). A wireless communication network does not have all communications transmitted wirelessly, but is configured to have at least some communications transmitted wirelessly.

Referring to FIG. 1, a position location system and wireless telecommunication network 10 includes mobile access terminals (ATs) 12 (also called a mobile device or mobile station), a base transceiver station (BTS) 14 (also called a base station), a position determining entity (PDE) 16, a satellite 18, and a wireless local area network (WLAN) access point 20. The system 10 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a SC-FDMA signal, etc. Each modulated signal may be sent on a different carrier. The ATs 12 are located in diverse environments, here in an urban setting among buildings 22, inside the buildings 22, in an open park area 24 outside that is quiet, in a construction zone 26 outside that is noisy, in a clothing store 28 inside where it is relatively quiet, in a restaurant 30 inside where it is very noisy, and inside of a fast moving train 32 where it is somewhat noisy. For simplicity, these environments are shown as being within one cell 15 of the BTS 14. These environments are different and present different challenges in position location. GPS positioning in urban environments and indoor can be especially unreliable, if not impossible. For example, the tall, densely packed buildings 22 can restrict views of the satellite 18 and large reflective surfaces of modern buildings can cause multiple transmission paths that interfere destructively. The highly disturbed GPS position information can limit the usability of location services (e.g., navigation, location-based services, and point-of-interest applications) available to the AT 12 in the urban environment. Knowing aspects of the environment of an AT 12 to be located can help with determining the position of the AT 12.

The BTS 14 can wirelessly communicate with the ATs 12. The BTS 14 may also be referred to as an access point, an access node (AN), a Node B, an evolved Node B (eNB), etc. The BTS 14 can be configured to communicate with the ATs 12 via multiple carriers. The BTS 14 can provide communication coverage for a respective geographic area, for example, the cell 15.

The ATs 12 may be referred to as mobile stations, mobile devices, user equipment (UE), or subscriber units. The ATs 12 here are cellular phones, but could also include wireless communication devices, personal digital assistants (PDAs), other handheld devices, laptop computers, notebook computers, etc.

The satellite 18 can be part of a global navigation satellite system, e.g., the Global Positioning System (GPS), the GLObal NAvigation Satellite System (GLONASS), or the Galileo system. Here, the satellite 22 is a GPS satellite with a transmitter capable of transmitting information for use in determining the position of the AT 12. The AT 12 includes a GPS receiver capable of wirelessly receiving position information from the satellite 18.

Figure 2:
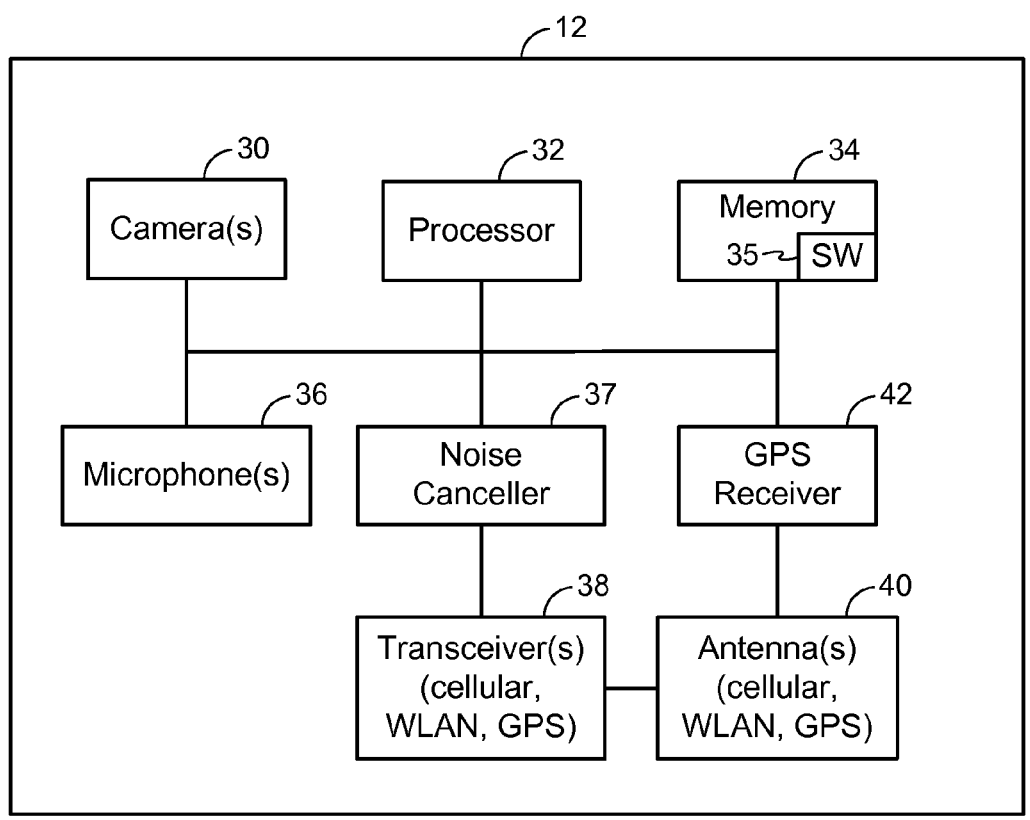
FIG. 2 is a block diagram of an access terminal of the network shown in FIG. 1.

Referring to FIG. 2, an exemplary one of the ATs 12 comprises a computer system including one or more image sensors (here cameras) 30, a processor 32, memory 34, one or more audio sensors (here microphones) 36, a noise canceller 37, transceiver(s) 38, antenna(s) 40, and a GPS receiver 42. The AT 12 is configured to sense environmental information, process the sensed information to determine one or more environmental characteristics and thus location-assistance information, and to use the location-assistance information to determine the location of the AT 12. The AT 12 can also provide the sensed information to another device that determines the location-assistance information and either provides this information to the AT 12 for determination of the AT's location, or determines the location itself and provides the location to the AT 12.

The camera 30 is configured to capture images. In some implementations, the computer system includes multiple cameras for capturing images.

The processor 32 is preferably an intelligent hardware device, e.g., a central processing unit (CPU) such as those made by Intel® Corporation or AMD®, a microcontroller, an application specific integrated circuit (ASIC), etc. The memory 34 includes random access memory (RAM) and read-only memory (ROM). The memory 34 stores a computer program product comprising computer-readable, computer-executable software code 35 containing instructions that are configured to, when executed, cause the processor 32 to perform various functions described herein. Alternatively, the software 35 may not be directly executable by the processor 32 but configured to cause the processor 32, e.g., when the instructions are compiled and executed, to perform the functions described.

Preferably, the AT 12 includes multiple microphones 36, but the AT 12 could include only one microphone 36. For the discussion below, the AT 12 is assumed to have one camera 30 and two microphones 36. The microphones 36 are positioned about the AT 12 to receive audio information from the environment. For example, one microphone 36 could be positioned on a front of the AT 12 to receive voice signals from a user of the AT 12 and another microphone 36 could be positioned on a back of the AT 12 to receive environmental audio signals.

The noise canceller 37 is configured to receive composite signals indicative of primary audio and background audio sensed by the microphones 36. The noise canceller is configured to isolate and reduce/remove (e.g., using a feed-forward mechanism) background audio or noise from the composite signals before the composite signals are transmitted via the transceiver(s) 38. Audio received from at least one of the microphones 36 is expected to carry a voice call which is not desired in environment perception. This is contrary to regular voice processing where background noise is to be removed while preserving the voice. The noise canceller 37 tracks and filters the main sources of background noise. This tracked and filtered background noise is routed aside and used as an input to mobile audio environment perception logic. Alternatively, a voice filter could be applied that is customized to the mobile user through training in order to remove user voice and preserve background noise. The training of a filter would likely be very effective because a given mobile device 12 is typically used solely by a single user. With one microphone 36 oriented to the direction of the user's mouth and another microphone 36 directed to capture the environmental audio activities, then after identification of the user's voice, the environmental audio can be separated even more clearly.

Although the AT 12 could include only one transceiver 38 and one antenna 40, the AT 12 preferably, as assumed below, includes multiple transceivers 38 and multiple antennas 40. The transceivers 38 are configured to communicate through corresponding antennas 40 with the BTS 14, WLAN access points, the satellite 18, WWAN access points, or other appropriate device for use in determining the position of the AT 12. The transceivers 38 may include, e.g., far-field communication transceivers such as GSM, CDMA, LTE, and WiMAX transceivers, near-field communication transceivers such as WLAN, Bluetooth, and UWB transceivers, and/or broadcast receivers such as GPS or mobile TV (MediaFlo, DVB-H) receivers. The GPS receiver 42 is configured to process GPS signals received via a GPS antenna of the antennas 40 to determine a position of the mobile device 12, e.g., in conjunction with the processor 32 and the memory 34.

Figure 3:
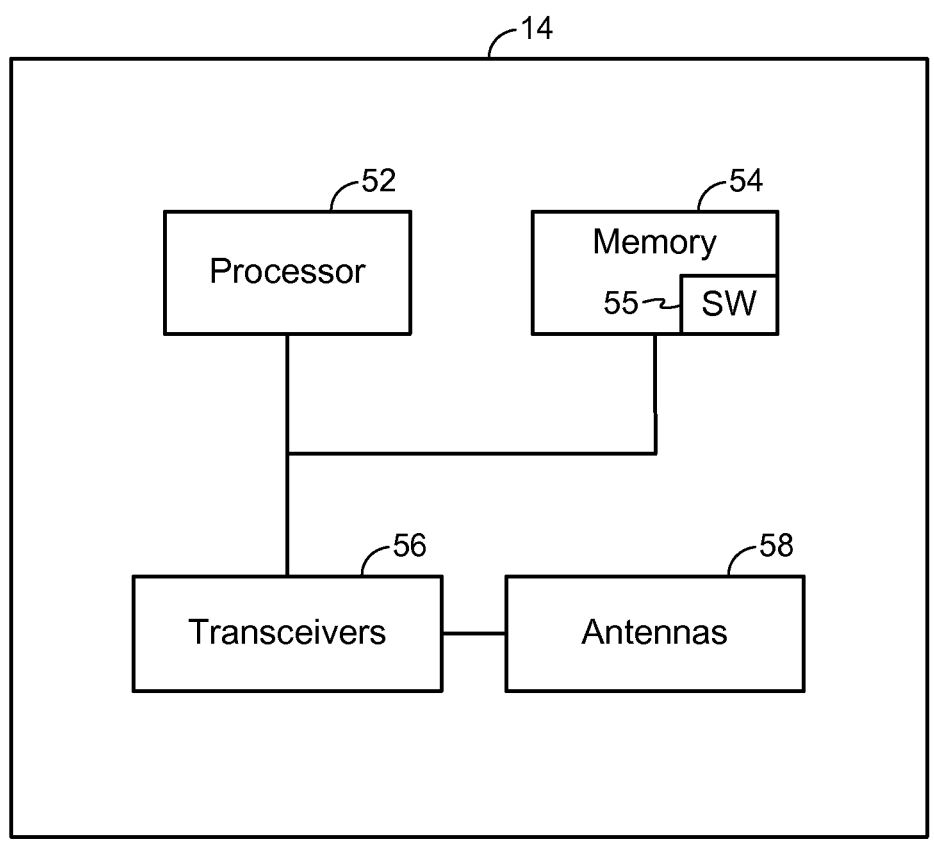
FIG. 3 is a block diagram of a base transceiver station shown in FIG. 1.

Referring to FIG. 3, an exemplary one of the BTS's 14 comprises a computer system including a processor 52, memory 54, transceivers 56, and antennas 58. The processor 52 is preferably an intelligent hardware device, e.g., a central processing unit (CPU) such as those made by Intel® Corporation or AMD®, a microcontroller, an application specific integrated circuit (ASIC), etc. The memory 54 includes random access memory (RAM) and read-only memory (ROM). The memory 54 stores computer-readable, computer-executable software code 55 containing instructions that are configured to, when executed, cause the processor 52 to perform various functions described herein. Alternatively, the software 55 may not be directly executable by the processor 52 but configured to cause the processor 52, e.g., when the instructions are compiled and executed, to perform the functions described. The transceivers 56 are configured to communicate bi-directionally with the ATs 12 through the antennas 58 and to receive positioning signals, e.g., GPS signals from the satellite 18. While the components 52, 54, 55, 56, 58 are shown and described as being within the BTS 14, some or all of these or similar components could be provided in a server distinct from the BTS 14, e.g., the PDE 16 or other server.

Figure 5:
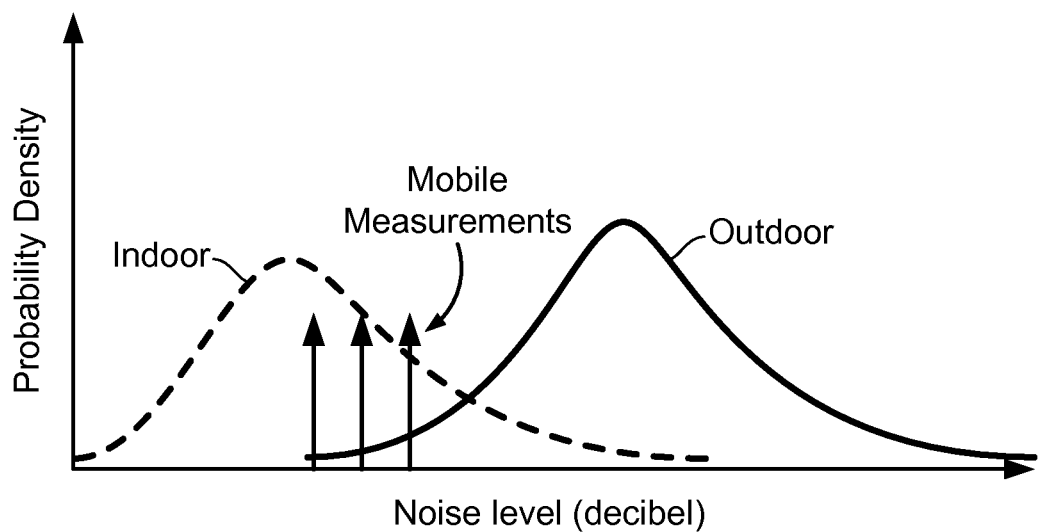
FIG. 5 is a graph of audio probability density functions of different environment types and access terminal measurements.

Referring to FIG. 4, with further reference to FIGS. 2-3, the memories 34, 54 store databases of information. These databases may include similar types of information, may include portions with sets of information different from other portions of the same memory and/or different than portions of the other memory. For example, the memory 54 stores a table 60 that includes sensor information 62, environmental characteristics 64, and time information 66. While the table 60 includes sensor information 62, environmental characteristics 64 and time information 66, one or more of these types of information may be omitted from a table stored in either of the memories 34, 54, and/or any of the subcomponents of these information categories 62, 64, 66 may not be stored in any particular table. The sensor information 62 includes both audio information 68 and visual information 70. The audio information 68 includes signal information 72, magnitude information 74, and spectral characteristics 76. The signal information 72 provides a general description or categorization of the signal, e.g., the level of noise (quiet, noisy, very noise, etc.) and/or the type of main signals (human noise, car noise, heavy equipment noise, animal noise, etc.). The magnitude information 74 provides a decibel level or levels of the signal. For example, the magnitude information 74 may be an average decibel level of the signal over a specified frequency band. Referring to FIG. 5, the magnitude information 74 may be in the form of plots of noise levels versus probability density for different environments, such as indoor and outdoor, as shown. FIG. 5 also shows an example of audio magnitudes sensed by the mobile device 12, although this information is not part of the stored magnitude 74, but compared against the stored information.

Figure 6:
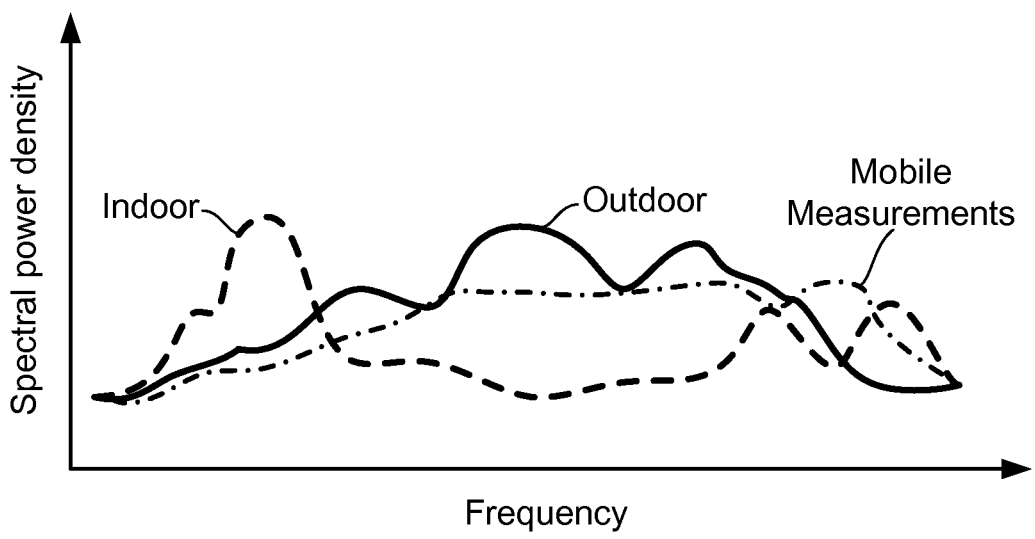
FIG. 6 is a graph of spectral distributions of audio signals from different environment types and an access terminal measurement.

The spectral characteristics 76 are information describing specific characteristics of the signal over different frequencies, such as the frequency band (i.e., range of frequencies) of the signal, or mean and standard deviation (or peak, minimum, maximum) of signal amplitudes per frequency bins. The spectral characteristics are collected and stored per region or region type. For example, referring to FIG. 6, the spectral characteristics 76 may be plots of frequency versus spectral power densities for different environments, such as indoor and outdoor, as shown. FIG. 6 also shows an example of spectral power density versus frequency sensed by the mobile device 12, although this information is not part of the stored spectral characteristics 76, but compared against the stored information.

The spectral information shown in FIG. 6 provides a more accurate and distinctive description of the environment compared to the magnitude information shown in FIG. 5. Some places may have high frequency noise while others may have low frequency noise. This spectral pattern is expected to be more distinctive than simple noise level measurements and depending on its distinctiveness could distinguish different environment types (e.g. indoor versus outdoor) or could be linked to a specific location (e.g. airport or construction site).

The visual information 70 preferably comprises image data gathered by the cameras 30 of the mobile device 12. The visual information 70 may further include information gleaned from the raw image data, such as identifications of landmarks, buildings, or other reference objects.

The environmental characteristics 64 include location type 78, location 80, and determination settings/techniques 82. The location type 78 provides an indication of the type of environment in which the mobile device 12 currently resides. This information describes the location type to a degree that is useful in determining how to process other information in order to help determine the location of the mobile device 12. For example, the location type 78 may indicate that the mobile device 12 is currently indoors, outdoors, indoors in a quiet environment, indoors in an office, indoors in a noisy environment such as a restaurant, outdoors roadside, in a residential area, in a business district, near a construction zone, etc. These location types are useful in setting various parameters or techniques for helping to determine the location of the mobile device 12. The determination settings/techniques 82 provide information as to particular position determination settings and/or techniques that may be used corresponding to the audio information 68. This category in the table 60 may be populated due to an analysis of the audio information 68 and/or the visual information 70. For example, the determination setting/techniques 82 may indicate a particular setting for a tracking filter such as a Kalman filter and for a type of positioning method to use, such as GPS positioning, Wi-Fi positioning, or AFLT or Observed Time Difference of Arrival (OTDOA) positioning, etc. The tracking filter setting could include the expected mobile dynamic model (e.g. mean and standard deviation of mobile speed and acceleration) and/or the expected level of measurement noise per associated positioning sensor. For example, if very slow mobile movement is expected, the rate of positioning could be reduced in order to reduce power consumption. The type of positioning methods or sensor could list the order of most effective positioning sensors in the perceived environment or region such as GPS, AFLT, WiFi for outdoors and WiFi, AFLT, GPS for indoors. The order of positioning methods to use depends on the expected signal availability, positioning accuracy, time to fix, and/or power consumption and depending on the priority, a different sequence of positioning methods could be tried in a given environment. With this guidance, the mobile could save unnecessary power consumption for sensors unlikely to work for the given environment by trying the most likely sensors first. The determination setting/technique 82 may be influenced by position fixes associated with collected audio information. The default setting is adapted to the specific local environment or the specific mobile experience. Thus, the setting/technique 82 may have a default value based on the environment types, e.g., use GPS for outdoor environments, WiFi for indoor environments, and AFLT or OTDOA for urban canyon environments, that can be changed based on actual location determination to support location-specific variance due to different levels of radio resource distribution and penetration. For example, if a specific indoor location is determined using GPS, such that GPS is known to work well in that specific indoor location (e.g., a home with wooden walls), then the determination setting/technique 82 can indicate to use WiFi as a default but to use GPS if the location of the mobile device 12 can be determined to be the particular location (e.g., using the audio information and other information, e.g., known cell).

The time information 66 includes both time of day information 84 and date information 86. The time of day information 84 indicates the hour and minute, preferably, associated with the stored audio information 68 and/or visual information 70. Other granularities, however, of time of day information may be used (e.g., morning, afternoon, evening, night). The date information 86 may include various degrees of granularity of information, for example the day of the year, the day of the month, the day of the week, whether the present day is a weekday versus a weekend day, a work day or school day versus an off day (e.g., weekend or holiday), etc. The environmental characterizations of the same location may be dependent upon the time/day (e.g., the same location may be loud during certain days/times and quiet during other days/times).

The information in the table 60 is stored in records 88. Each record 88 has information associated with other information in that record 88 such that the sensor information 62 has associated environmental characteristics 64 and associated time information 68, the environmental characteristics 64 have associate sensor information 62 and associated time information 66, and the time information 66 has associated sensor information 62 and associated environmental characteristics 64. The audio information 68 and the time information 66 of a single record 88 correspond to audio information 68 obtained at the time of day and date indicated by the time of day information 84 and the date information 86. The information in the records 88, therefore, may be used to help more quickly identify information to assist in determining the location of the mobile device 12, or otherwise process information at or from the mobile device 12. For example, the time information 66 may be useful in assuming a seed location of the mobile device 12, e.g., based on historical time/location information for that mobile device 12, while the audio information 68 is compared with presently-obtained audio information from the microphones 36.

The memories 34, 54 may store various versions of the table 60. Different granularities and/or combinations of the information shown in the table 60 may be stored in either of the memories 34 or 54. For example, one instance of the table 60 may be an almanac (including multiple records) that is stationary and location-unspecific while other instances may be almanacs that are location/region-specific (e.g., of a city, a county, a telecommunication cell) and have region-specific associations of the sensor information 62, the environmental characteristics 64, and the time information 66. Further, different tables and/or records within each of the memories 34, 54 may include different types, amounts, and/or granularities of information. The different tables of information stored in the memories 34, 54 may be associated with different characteristics, such as different regions/locations, different times/days, etc. The mobile device 12 may store public almanacs 60 of information and personalized almanacs of information based on sensor information collected in conjunction with a good position fix. Thus, the mobile device 12 can use a specific, personalized almanac for places that the mobile device has traveled to and may return to (e.g., home, office, etc.). This may help ease the burden on the positioning device such as the PDE 16 and can help more accurately and quickly determine the mobile device's location.

Figure 7:
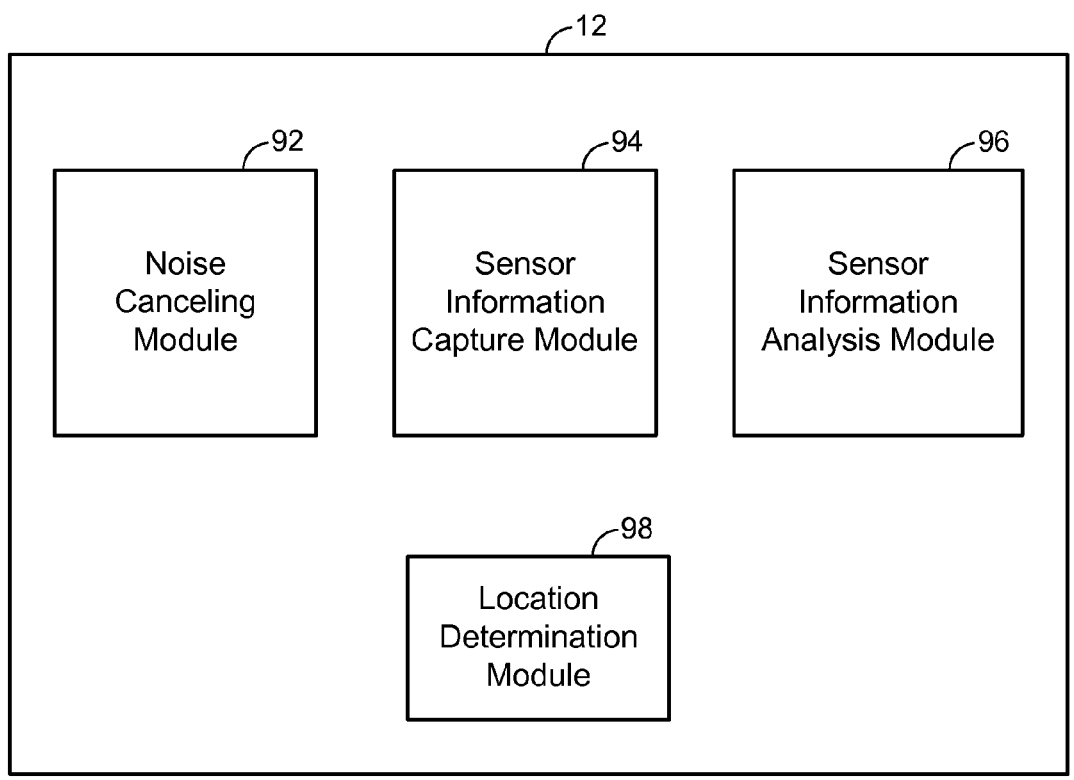
FIG. 7 is a block diagram of functional modules of the access terminal shown in FIG. 2.

Referring to FIG. 7, with further reference to FIG. 2, the mobile device 12, and in particular the processor 32 and the memory 34 including the software 35, implement a noise-canceling module 92, a sensor information capture module 94, a sensor information analysis module 96, and a location determination module 98. The noise-canceling module 92 may be implemented digitally in the processor 32 executing the software 35, or may be implemented in hardware, firmware, or a combination of any of these. The noise-canceling module 92 receives audio information from the microphones 36 and extracts background noise and cancels this out from the audio signal, preferably using a feed-forward configuration. The background noise is filtered from the composite signal having both desired audio, and background noise, for delivery of the desired audio, e.g., to a call recipient. The background noise is provided to the sensor information capture module 94.

The sensor information capture module 94 obtains background audio information and/or visual information. The audio information is preferably obtained from the noise-canceling module 92 as the filtered background audio information. The capture module 94 obtains the visual information from the camera 30. The audio and visual information is stored by the capture module 94 in the memory 34.

The sensor information analysis module 96 is configured to analyze the audio and visual information stored by the capture module 94 in the memory 34. The analysis module 96 is configured to analyze the audio and visual information both to populate the records in tables such as the table 60 shown in FIG. 4 and to use information stored in tables such as the table 60 to help determine information useful in determining the location of the mobile device 12.

The analysis module 96 is configured to obtain audio and visual information models. Some models may be stored permanently in the memory 34, such as models for determining general environmental characteristics, such as outdoor versus indoor. More specific models may be obtained dynamically and may be stored temporarily in the memory 34. For example, the analysis module 96 may request and receive downloaded models from the base station 14, e.g., region-specific models as discussed further below with respect to FIG. 8. For example, the analysis module 96 may request region-specific models upon entry into a new cell of a cellular telecommunication network. The analysis module 96 may alternatively request region-specific or other models in response to other criteria, such as moving a distance greater than a threshold distance from a reference location or a location at which the most recently downloaded model was obtained. Further still, the analysis module 96 may request new models, updated models, or indicia that no such models exist, periodically such as once a week. Further or alternatively, the analysis module 96 may receive models without having requested the models, e.g., periodically from any base stations 14 in communication with the mobile device 12. Models may be requested or on demand for audio analysis, or on demand for a location fix.

The analysis module 96 is configured to compare sensor information presently obtained by the cameras 30 and the microphones 36 against known sensor information models. The analysis module 96 can compare audio information and/or visual information against appropriate models to determine corresponding environmental characteristics. For example, the analysis module 96 can compare presently-obtained signal profiles against stored profiles and/or compare the spectral signature of presently-obtained audio against a model that provides spectral characteristics of audio signals. Alternatively, the analysis module 96 may compare other criteria such as average volume, peak volume, etc. against models having similar granularities of information. Similarly, the module 96 can compare various criteria of presently-obtained visual information, such as images, brightness levels, etc. against corresponding models to determine environmental characteristics such as indoor versus outdoor, etc. The module 96 can search/filter for key audio information such as sounds and/or frequencies that are associated with particular environments, e.g., airplane engines, crosswalk audio alerts, television stations, construction sounds, etc. Using the magnitude information 74, based on probability density functions, the likelihood of each candidate environment is derived and provided to the location determination module 98. For a very high volume noise measurement, an environment like "airport" or "construction site" would have the highest likelihood while a low volume audio measurement provides the highest probability to indoor places such as "office" or "home." Using the spectral characteristics information 76, the module 96 can pattern match and estimate the proximity of a mobile measurement to candidate spectral patterns. The module 96 can deliver the candidate with highest proximity or sorted candidates in the order of proximity to the location determination module 98 with matching quality indexes. The detection results from the magnitude information 74 and the spectral characteristics information 76 could be used together or independently to determine the environment type. For example, in the first stage, "construction site" or "airport" are selected due to a high sensed volume and, in the second stage, is narrowed down to "airport" due to a specific spectral pattern of airplane noise.

The analysis module 96 can store results of the analysis of the sensor information or otherwise process the results. For example, the module 96 can store results of the analysis in the memory 34, such as by populating the records 88 in the table 60 with information such as the location type 78, signal 72, magnitude 74, spectral characteristics 76 of the obtained sensor information and the results of the analysis thereof. The analysis module can further populate the table 60 with information such as known determination settings/techniques 80 corresponding to the location type determined by the analysis. Further, the analysis module 96 can store the location type 78 determined from the analysis of the sensor information. The analysis module 96 is further configured to provide location assistance information (e.g., seed location, satellite search window) resulting from the analysis of the sensor information.

The location determination module 98 is configured to use information from the analysis module 96 to determine the location of the mobile device 12. The determination module 98 can set parameters to be used in determining and tracking the mobile location, for example, a filtering coefficient of a Kalman filter based on an expected mobile dynamics model, a seed location of a GPS analysis, a search window for obtaining signals from GPS satellites (e.g., elevation and/or azimuth angles, signal power level, etc.), etc. Further, the determination module 68 can use the information from the analysis module 96 to select which technique or techniques to use to determine the location of the mobile device 12. For example, the determination module can determine or select to use Wi-Fi, GPS, cellular triangulation (e.g., AFLT or OTDOA), or broadcast signal (e.g., analog/digital television or radio signals) based positioning. Further still, the location determination module 98 can identify specific locations of the mobile device 12. For example, if the analysis module 96 determines that the audio environment of the mobile device 12 is that of an airport, then the location module 98 may determine the specific airport given information about the general vicinity of the mobile device 12, e.g., the cell 15 in which the mobile device 12 presently resides or based on the mobile device's historical trajectories.

Figure 8:
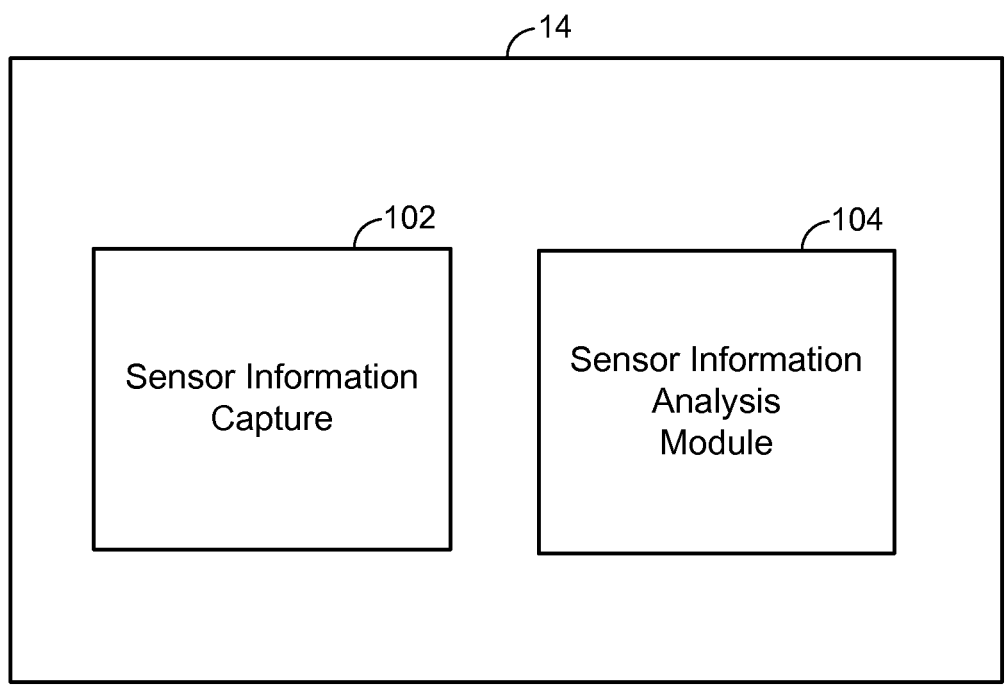
FIG. 8 is a block diagram of functional modules of the base transceiver station shown in FIG. 3.

Referring to FIG. 8 with further reference to FIGS. 2-3 and 7, the base station 14 includes a sensor information capture module 102 and a sensor information analysis module 104. While these modules 102, 104 are shown in the base station 14, all or portions of these modules 102, 104 can be located elsewhere in the system, e.g., in a server such as the PDE 16.

The capture module 102 is configured to obtain sensor information from the mobile stations 12 and store this information accordingly. The capture module 102 can receive uploaded audio and visual information from mobile stations 12 and populate look-up tables with the corresponding information. For example, the capture module 14 can populate records in a look-up table such as the table 60, including populating the signal information field 72, the magnitude information 74, the spatial characteristics 76, the visual information 70, and the time information 66.

The sensor information analysis module 104 is configured to analyze the stored sensor information for use in populating the look-up table 60 and determining information useful for determining the location of a mobile device 12. The analysis module 104 can, similar to the analysis module 96, analyze presently-obtained audio information 68 and the visual information 70 to determine environmental characteristics of a mobile device such as the location type 78 and the determination settings/techniques 82. The analysis module 104 can populate the look-up table records with such information. The analysis module 104 can further aggregate information obtained from multiple mobile stations 12 or from the same mobile station 12 at different times and/or locations in order to provide aggregate records for the look-up table 60. For example, an aggregate record may have an average magnitude of signals that are determined to have a similar location type. Further still, a record with a similar signal and location type may have aggregate time information such as a range of times during a day.

The analysis module 104 is further configured to provide results of the analysis, including look-up tables, to the mobile stations 12. For example, the analysis module 104 can transmit look-up tables to any mobile stations entering the cell 15. The look-up table 60 may be updated and sent periodically to mobile stations 12 within the cell 15.

The sensor information analysis module 104 can also perform comparisons of sensor information presently associated with a mobile device 12 with stored information in order to characterize or determine the location type or location of a mobile device 12. The analysis module 104 can compare present audio information and/or present visual information received from a particular mobile device 12 with stored records in the look-up table 60 to determine whether a stored record matches or is similar to, e.g., within various tolerances, the presently-obtained sensor information. If so, the analysis module 104 can access the corresponding location type 78, location 80 (if such information is available), and/or the determination settings/techniques 82. The analysis module 104 can use this information to determine the location of the mobile device 12 or to provide information to the mobile device 12 or other system entities such as the PDE 16 to help determine the location of the mobile device 12.

Figure 9:
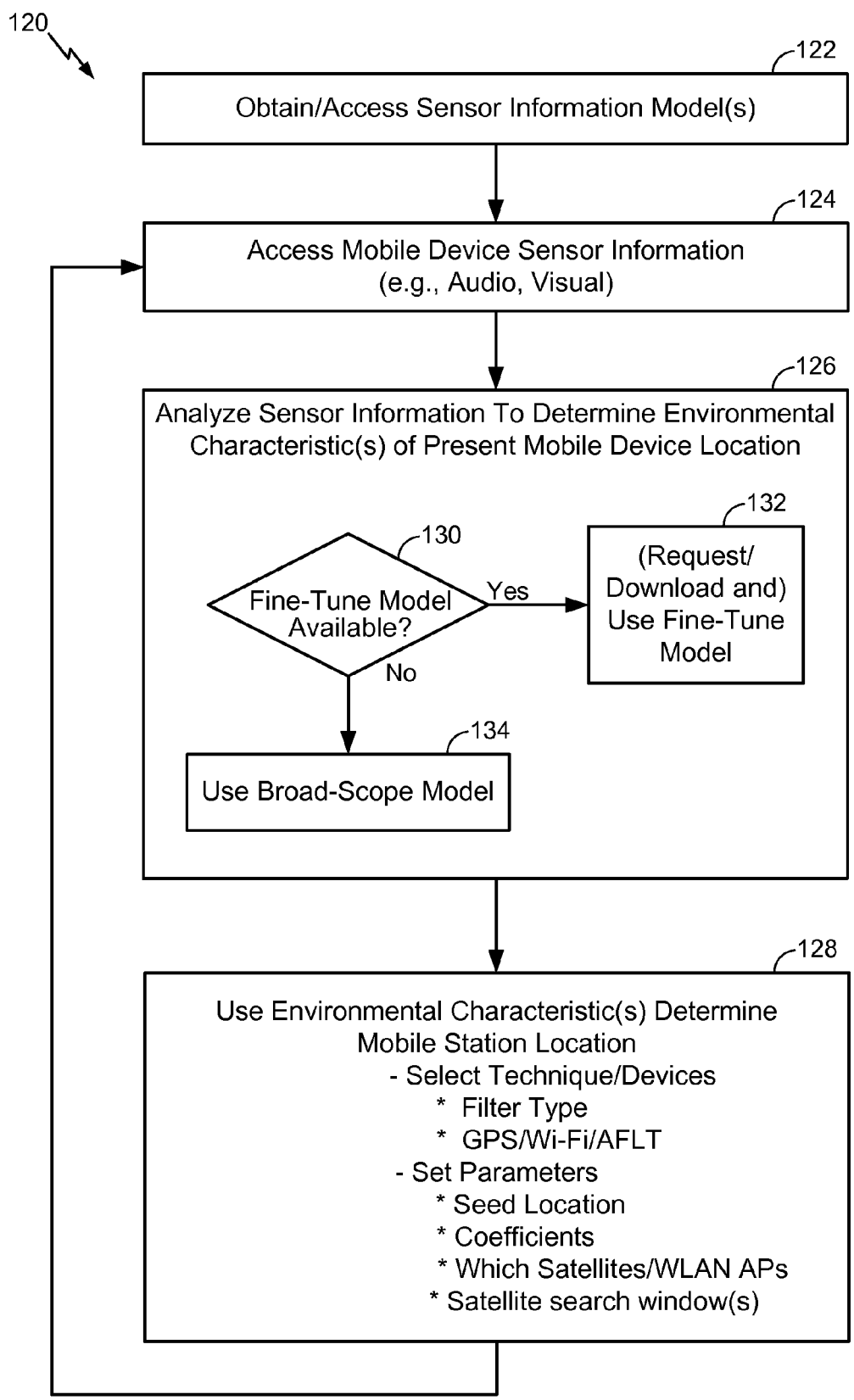
FIG. 9 is a block flow diagram of a process of determining a position of an access terminal shown in FIG. 1.

Referring to FIG. 9, with further reference to FIGS. 1-8, a process 120 of determining the location of a mobile station 12 includes the stages shown. The process 120, however, is an example only and not limiting. The process 120 can be altered, e.g., by having stages added, removed, or rearranged.

At stage 122, sensor information models are obtained. The mobile station 12 preferably obtains broad-scope models such as broad-scope look-up tables as part of the manufacture of the mobile station 12, or by being downloaded, e.g., from the PDE 16 or a location assistance server through the BTS 14 or other communication link, to the mobile station 12 well in advance of a desired use of any such models. The broad-scope models provide information from which broad-level determinations as to environmental characteristics can be determined, such as whether the mobile station is indoors or outdoors. Further, the mobile station 12 obtains fine-tuned models providing the ability to more finely determine the environmental characteristics associated with the mobile device 12. These models, such as the look-up table 60, can be obtained in a variety of ways by the mobile station. For example, the look-up table 60 can be obtained periodically, or by request or automatically, such as in response to the mobile station 12 entering a new cell 15, moving a distance greater than a threshold from a reference location such as the location when the last fine-tuned model was downloaded. The models are preferably obtained by any entity within the system 10 that will be making the analysis of sensor information obtained by the mobile station 12. For example, in addition to or instead of the mobile station 12, the models can be obtained by the base station 14 or the PDE 16.

At stage 124, mobile device sensor information is accessed. The mobile device 12 may access this information internally, or other entities (e.g., the PDE 16) may access this information by communicating with the mobile station 12. The mobile station 12 uses the microphones 36 and the camera 30 to obtain the mobile device sensor information associated with the environment in which the mobile station 12 presently resides. Here, the sensor information capture module 94 of the mobile station 12 obtains visual information from the camera 30 and audio information from the microphones 36. The sensor information can be obtained in a variety of ways, such as periodically, during active use of the mobile station 12 (e.g., during a phone call, while taking pictures, etc.), upon request (e.g., by the base station 14, by the PDE 16, etc.), etc. The noise canceling module 92 obtains background audio and provides this information to the capture module 94. The sensor information obtained by the MS 12 is provided to the entity that will be performing the analysis on the sensed information, such as the sensor information analysis module 96 of the mobile device 12, the analysis module 104 of the base station 14, or other appropriate device.

At stage 126, the sensor information obtained at stage 124 is analyzed to determine one or more environmental characteristics of the mobile device's present location. The sensed information is compared by the analysis module 96 with stored models of corresponding sensory information (e.g., statistical models of audio patterns). The sensed information can be compared against one or more stored models. Within the stage 126, at a substage 130, an inquiry is made as to whether a fine-tune model is available, either presently stored by the MS 12 or accessible. If so, then stage 132 is performed, where a stored fine-tune model is used, or if not stored by the MS 12 is requested and downloaded and then used, in comparing and analyzing the sensed information from the mobile device 12. If a fine-tune model is not available, then at substage 134 a broad-scope model is used to analyze the sensed information. The sensed information is compared against the model information to determine whether the sensed information matches or is close enough to one of the stored models to conclude that the sensed information corresponds to the stored information and thus the corresponding environmental characteristic(s) can be used to help determine the location of the mobile device 12. It is possible that no such match will occur, and in this case, location determination will proceed in manners known in the art without the use of location assistance information provided by any of the stored models.

At stage 128, the environmental characteristic(s) is(are) used to affect a determination of the location of the mobile device 12. The location determination module 98 uses one or more of the environmental characteristics determined by the analysis module 96 at stage 126 to help determine the location of the mobile device 12. The environmental characteristics may be location assistance information and/or a location (possibly of less granularity than desired) of the mobile device 12. The location determination module 98 uses the information from the module 96 in affecting the location determination by selecting a technique and/or devices to use in determining location, such as determining a filter type (e.g., a Kalman filter, a Weighted Least Square (WLS) filter, or a particle filter), whether to use GPS, Wi-Fi, AFLT location information sensors and processes, etc. The determination module may further set various parameters for use in determining the location. For example, the determination module can use a rough location provided by the analysis module 96 as a seed location, information can be used to set coefficients for formulas or other parameters (e.g., a coefficient of a Kalman filter), which satellites and/or which WLAN access points (APs) to use can be selected, and/or satellite search windows can be set. For example, minimum and maximum thresholds can be set for use in searching for a satellite or a WLAN access point such as elevation/azimuth angles, signal power level, signal integration time, signal channel or code range, transmitter identification numbers, signal frequency stability and Doppler shift range, etc.

After stage 128, the process 120 returns to stage 124 to obtain further sensor information from the mobile device 12. Thus, the process 120 can be repeated and techniques and/or parameters used to determine the location of the mobile device 12 can be changed in response to information sensed by the mobile device 12 changing.

Numerous variations of this process 120 are possible. For example, the MS 12 can operate in a mobile standalone mode or a mobile-assisted mode as described, or in a server-based mode. In the mobile standalone mode, sensor information models are resident on the MS 12, and comparisons of present sensor information with the models are performed at the MS 12. In this mode, the MS 12 will typically use a few generic (global) models that are not updated. In the mobile-assisted mode, the MS 12 downloads models and updates to models, and comparisons between models and current sensor information are performed by the MS 12. The models may be more-detailed and/or specific than with the standalone mode models. In the server-based mode, the models are resident at the server, e.g., the PDE 16, and comparisons are made at the server using the measured information from the MS 12. The MS 12 reports measurements and the server performs the computation-intensive operations.

Other examples of implementations are within the scope and spirit of the disclosure. For example, portions of FIG. 9 may be performed elsewhere than as described above. For example, audio and/or other environmental information sensed by the mobile device may be sent to another device such as the PDE 16 for analysis and/or environmental characteristics determined by the comparison may be used by a device other than the mobile device 12, e.g., the PDE 16, to determine the location of the mobile device 12.

What is claimed is:

1. A method of determining a position of a mobile device in a wireless communication network, the method comprising:
   accessing mobile device audio information from the mobile device;
   analyzing the mobile device audio information to determine an environmental characteristic indicating at least one of a corresponding environment type or a specific location in which the mobile device currently resides; and
   using the environmental characteristic indicating the at least one of the corresponding environment type or the specific location in which the mobile device currently resides to affect a determination of the position of the mobile device, wherein using the environmental characteristic comprises selecting, based on the environmental characteristic determined from the mobile device audio information and indicating the at least one of the corresponding environment type or the specific location in which the mobile device currently resides, one or more location information sensors of the mobile device to obtain information for determining the position of the mobile device,
   wherein using the environmental characteristic comprises setting a position determination formula parameter based on the environmental characteristic, and wherein the position of the mobile device is determined using the position determination formula parameter.

2. The method of claim 1 wherein analyzing the mobile device audio information comprises comparing the mobile device audio information with a statistical model of audio patterns and corresponding environment types.

3. The method of claim 1 wherein using the environmental characteristic comprises changing the determination of the position based on a change of the environment type or the specific location in which the mobile device currently resides of the mobile device.

4. The method of claim 1 wherein using the environmental characteristic comprises using a position associated with the environment type or the specific location in which the mobile device currently resides as a seed position.

5. The method of claim 1 wherein accessing the mobile device audio information comprises accessing noise level information and analyzing the mobile device audio information comprises comparing the accessed noise level information with noise levels associated with different environmental characteristics.

6. The method of claim 1 wherein accessing the mobile device audio information comprises accessing spectral characteristics and analyzing the mobile device audio information comprises comparing the accessed spectral characteristics with spectral characteristics associated with different environments.

7. The method of claim 1 wherein accessing the mobile device audio information comprises obtaining mobile device audio information from multiple microphones of the mobile device.

8. The method of claim 1 further comprising accessing non-audio sensor information and analyzing the non-audio sensor information in conjunction with the mobile device audio information to determine the environmental characteristic.

9. The method of claim 1 wherein using the environmental characteristic comprises analyzing a look-up table of combinations of examples of environmental characteristic and determination information for affecting the determination of the position, and using the determination information in the determination of the position of the mobile device.

10. The method of claim 9 wherein the look-up table comprises a region-specific look-up table based on a region presently containing the mobile device, the method further comprising downloading the look-up table to the mobile device.

11. The method of claim 10 wherein the look-up table is downloaded to the mobile device in response to determining the region presently containing the mobile device.

12. The method of claim 1 wherein accessing the mobile device audio information from the mobile device comprises obtaining noise information from a noise canceling mechanism.

13. The method of claim 1 wherein using the environmental characteristic comprises affecting a search of a positioning device based on the environmental characteristic.

14. The method of claim 13 wherein affecting the search of the positioning device comprises at least one of: (1) altering a search procedure for a satellite or a WLAN access point; (2) affecting which satellites or WLAN access points are searched for; or (3) setting a threshold used in searching for the satellite or WLAN access point.

15. The method of claim 1 wherein analyzing the mobile device audio information comprises analyzing the mobile device audio information for specific sounds or frequencies associated with known environments.

16. The method of claim 1 wherein the method is one of (1) a mobile standalone method wherein the analyzing is performed by the mobile device, (2) a mobile-assisted method wherein the analyzing is performed by the mobile device and the method further comprises wirelessly downloading by the mobile device of at least portions of statistical models for use in the analyzing, and (3) a server-based method wherein the mobile device audio information is wirelessly uploaded from the mobile device and the analyzing is performed by a server displaced from the mobile device.

17. The method of claim 1 wherein using the environmental characteristic further comprises using the environmental characteristic to select one or more positioning methods for determining the position of the mobile device based on the environmental characteristic.

18. The method of claim 17 wherein selecting the one or more positioning methods comprises selecting an order of positioning methods to use for determining the position of the mobile device based on, for each of the one or more positioning methods, at least one of expected signal availability, positioning accuracy, time to fix, or power consumption.

19. The method of claim 1 wherein using the environmental characteristic further comprises using the environmental characteristic to select, based on the environmental characteristic, a filter type for determining the position of the mobile device, the filter type comprising at least one of a Kalman filter, a Weighted Least Square filter or a particle filter.

20. The method of claim 1 wherein using the environmental characteristic comprises:
  determining an estimated movement speed associated with the environmental characteristic; and
  adjusting a rate for determining the position of the mobile device based on the estimated movement speed.

21. A computer program product residing on a non-transitory processor-readable medium and comprising processor-readable instructions configured to cause a processor to:
  access mobile device audio information from a mobile device in a wireless telecommunication network;
  analyze the mobile device audio information to determine an environmental characteristic indicating at least one of a corresponding environment type or a specific location in which the mobile device currently resides;
  use the environmental characteristic indicating the at least one of the corresponding environment type or the specific location in which the mobile device currently resides to affect a determination of a position of the mobile device at least in part by selecting, based on the environmental characteristic, determined from the mobile device audio information and indicating the at least one of the corresponding environment type or the specific location in which the mobile device currently resides, one or more location information sensors of the mobile device to obtain information for determining the position of the mobile device; and
  use the environmental characteristic to set a position determination formula parameter based on the environmental characteristic, and to determine the position of the mobile device using the position determination formula parameter.

22. The computer program product of claim 21 wherein the instructions configured to cause the processor to analyze the mobile device audio information are configured to cause the processor to compare the mobile device audio information with a statistical model of audio patterns and corresponding environment types.

23. The computer program product of claim 21 wherein the instructions configured to cause the processor to use the environmental characteristic are configured to cause the processor to use a position associated with the environment type or the specific location in which the mobile device currently resides as a seed position.

24. The computer program product of claim 21 wherein the instructions further comprise instructions configured to cause the processor to access non-audio sensor information and to analyze the non-audio sensor information in conjunction with the mobile device audio information to determine the environmental characteristic.

25. The computer program product of claim 21 wherein the instructions further comprise instructions configured to cause the processor to access region-specific associations of mobile device audio information and environmental characteristics corresponding to a region presently containing the mobile device.

26. The computer program product of claim 21 wherein the instructions configured to cause the processor to access the mobile device audio information are configured to cause the processor to obtain noise information, from a noise canceling mechanism, as the mobile device audio information.

27. The computer program product of claim 21 wherein the instructions configured to cause the processor to use the environmental characteristic are configured to cause the processor to affect a search of a positioning device based on the environmental characteristic by at least one of: (1) altering a search procedure for a satellite or a WLAN access point; (2) affecting which satellites or WLAN access points are searched for; or (3) setting a threshold used in searching for the satellite or WLAN access point.

28. The computer program product of claim 21 wherein the processor-readable medium resides in at least one of the mobile device or a server displaced from the mobile device.

29. An apparatus for determining a position of a mobile device in a wireless communication network, the apparatus comprising:
  a memory storing records of audio sensor information and associated environmental characteristics for a plurality of sample environments; and
  a processor coupled to the memory and configured to:
  receive mobile device audio information collected by an audio sensor of the mobile device;
  compare the received mobile device audio information with the stored audio sensor information to select a stored record of audio sensor information corresponding to the received mobile device audio information and an associated environmental characteristic indicating at least one of a corresponding environment type or a specific location in which the mobile device currently resides; and
  use the associated environmental characteristic of the selected record, indicating the at least one of the corresponding environment type or the specific location in which the mobile device currently resides, to determine the position of the mobile device at least in part by selecting, based on the environmental characteristic, determined from the mobile device audio information and indicating the at least one of the corresponding environment type or the specific location in which the mobile device currently resides, one or more location information sensors of the mobile device to obtain information for determining the position of the mobile device,
  wherein the processor is configured to use the associated environmental characteristic of the selected record to set a position determination formula parameter based on the associated environmental characteristic, and to determine the position of the mobile device using the position determination formula parameter.

30. The apparatus of claim 29 wherein the processor is configured to compare at least one of a noise level or a spectral characteristic of the received mobile device audio information with noise levels or spectral characteristics, respectively, of the stored audio sensor information.

31. The apparatus of claim 29 wherein the apparatus is the mobile device and the mobile device further comprises multiple microphones disposed, coupled, and configured to obtain and provide the mobile device audio information to the processor.

32. The apparatus of claim 29 wherein the memory further stores non-audio information and the processor is further configured to receive non-audio sensor information from the mobile device and analyze the non-audio sensor information in conjunction with the mobile device audio information to determine the associated environmental characteristic.

33. The apparatus of claim 29 wherein the processor is configured to request records of mobile device audio information that are associated with a present position of the mobile device.

34. The apparatus of claim 29 wherein the apparatus is the mobile device and the apparatus further comprises a noise cancellation module coupled to the processor and configured to filter background noise from sensed audio resulting in filtered background noise and to provide the filtered background noise to the processor as the mobile device audio information collected by an audio sensor of the mobile device.

35. The apparatus of claim 29 wherein the processor is configured to use the associated environmental characteristic to at least one of: (1) select a search procedure for a satellite or a WLAN access point; (2) select which satellites or WLAN access points are searched for; or (3) set a threshold used in searching for the satellite or WLAN access point.

36. The apparatus of claim 29 wherein the apparatus comprises one of (1) the mobile device, wherein the mobile device is configured to operate in a mobile standalone mode, (2) the mobile device, wherein the mobile device is configured to operate in a mobile-assisted mode and further comprises a transceiver configured to receive wirelessly at least portions of the stored audio sensor information, or (3) a server further comprising the transceiver configured to receive the mobile device audio information collected by the audio sensor of the mobile device.

37. An apparatus for determining a position of a mobile device in a wireless communication network, the apparatus comprising:
   means for accessing mobile device audio information from the mobile device;
   analyzing means for analyzing the mobile device audio information to determine an environmental characteristic indicating at least one of a corresponding environment type or a specific location in which the mobile device currently resides; and
   processing means for using the environmental characteristic indicating the at least one of the corresponding environment type or the specific location in which the mobile device currently resides to affect a determination of the position of the mobile device at least in part by selecting, based on the environmental characteristic, determined from the mobile device audio information and indicating the at least one of the corresponding environment type or the specific location in which the mobile device currently resides, one or more location information sensors of the mobile device to obtain information for determining the position of the mobile device, wherein the processing means are configured to set a position determination formula parameter based on the environmental characteristic and to determine the position of the mobile device using the position determination formula parameter.

38. The apparatus of claim 37 wherein the analyzing means are configured to compare the mobile device audio information with a statistical model of audio patterns and corresponding environment types.

39. The apparatus of claim 37 wherein the means for accessing and the analyzing means are configured to access at least one of noise level information or spectral characteristics and to compare at least one of the accessed noise level information or accessed spectral characteristics with noise levels or spectral characteristics associated with different environmental characteristics.

40. The apparatus of claim 37 wherein the means for accessing are configured to access non-audio sensor information and the analyzing means are configured to analyze the non-audio sensor information in conjunction with the mobile device audio information to determine the environmental characteristic.

41. The apparatus of claim 37 wherein the means for accessing are configured to access region-specific combinations of mobile device audio information and corresponding environmental characteristics based on a region presently containing the mobile device.

42. The apparatus of claim 37 wherein the means for accessing the mobile device audio information comprises a noise canceling mechanism.

43. The apparatus of claim 37 wherein the processing means are configured to affect a search of a positioning device based on the environmental characteristic.

44. The apparatus of claim 37 wherein the apparatus comprises one of (1) the mobile device, wherein the mobile device is configured to operate in a mobile standalone mode, (2) the mobile device, wherein the mobile device is configured to operate in a mobile-assisted mode and further comprises a transceiver configured to receive wirelessly at least portions of the stored audio sensor information, or (3) a server further comprising the transceiver configured to receive the mobile device audio information collected by an audio sensor of the mobile device.

45. An apparatus for determining a position of a mobile device in a wireless communication network, the apparatus comprising:
   means for accessing mobile device audio information;
   categorizing means for determining an environmental category indicating at least one of a corresponding environment type or a specific location in which the mobile device currently resides based on the mobile device audio information;
   selecting means for selecting, based on the environmental category, determined based on the mobile device audio information and indicating the at least one of the corresponding environment type or the specific location in which the mobile device currently resides, a location information sensor of the mobile device to sense information for determining the position of the mobile device, and
   setting a position determination formula parameter based on the environmental characteristic and to determine the position of the mobile device using the position determination formula parameter.

* * * * *